March 5, 1929.  M. W. MOESTA  1,704,138
SCUFF PLATE AND RETAINING MEANS THEREFOR FOR VEHICLE BODIES
Filed Aug. 11, 1927
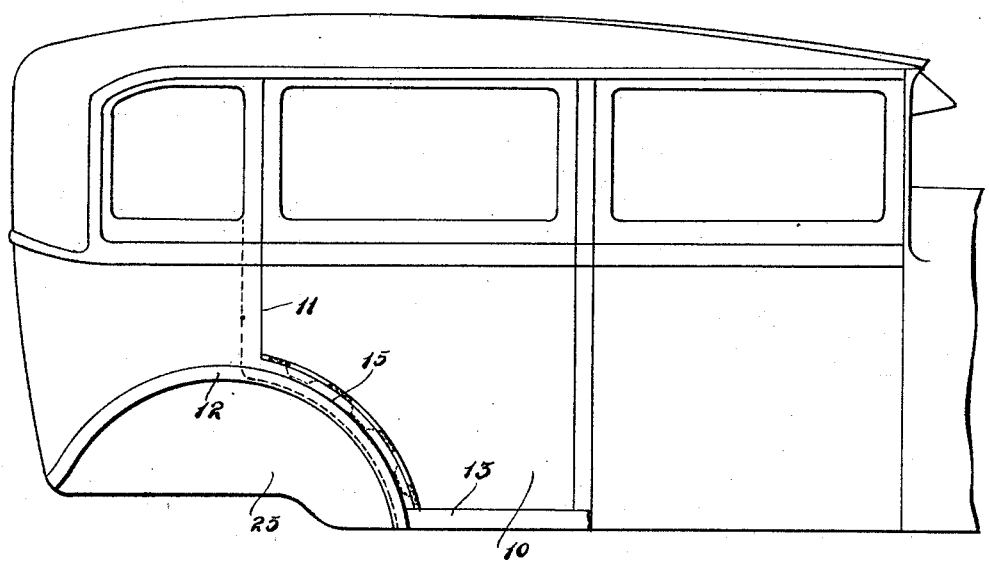
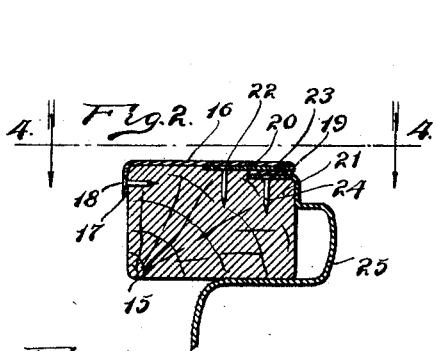
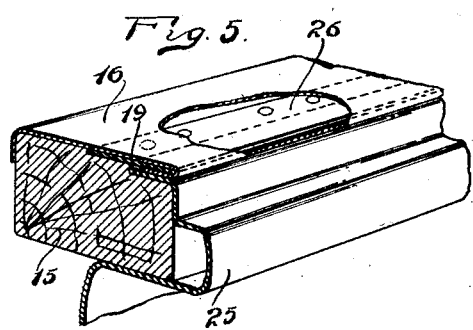
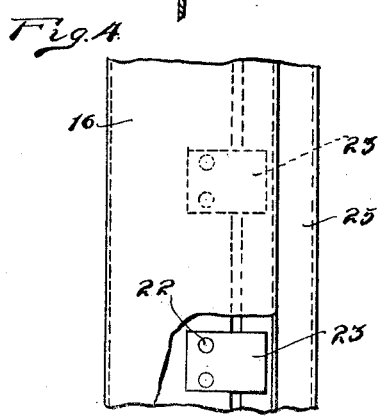
Inventor
Marvin W. Moesta.
By J. King Harness
Attorney Patented Mar. 5, 1929.

1,704,138

UNITED STATES PATENT OFFICE.

MARVIN W. MOESTA, OF DETROIT, MICHIGAN, ASSIGNOR TO THE MURRAY CORPORATION OF AMERICA, A CORPORATION OF DELAWARE.

SCUFF PLATE AND RETAINING MEANS THEREFOR FOR VEHICLE BODIES.

Application filed August 11, 1927. Serial No. 212,170.

One object of my invention is to provide scuff plates and retaining means therefor for vehicle sill members and other parts which provides the covered member with a smooth surface and conceals all securing or fastening means.

With this and other objects in view, my invention consists in the arrangement, combination and construction of various parts of my improved device as described in the specification, claimed in my claims and shown in the accompanying drawings, in which,—

Fig. 1 is a side elevation for a vehicle body with parts broken away showing the application of my invention.

Fig. 2 is a cross section of a body pillar showing my invention applied thereto.

Fig. 3 is a perspective of one of the retainer plates embodied in my invention.

Fig. 4 is a view taken on the lines 4—4 of Fig. 2 and having certain parts broken away to show the position of the retainer plates.

Fig. 5 is a perspective of a modified form of retainer plates.

Referring to the drawing the numeral 10 designates a vehicle body, 11 a body pillar which extends from the top of the body downwardly, curves over the forward portion of the wheel housing 12 and is joined to the sill 13. The numeral 15 designates the curved portion of the pillar 11 to which my invention is applied.

It will be understood that the application of my invention to the portion 15 of pillar 11 is for purposes of illustration and that the invention is intended to be used on the door sills and such other sills or pillar members as have surfaces exposed to wear.

Referring to Fig. 2, the numeral 16 indicates the scuff plate which is formed with a depending flange 17 along its rear edge which fits over the rear side of the pillar 15 and is secured thereto by nails or screws 18. The front edge of plate 16 is return bent to form a spaced flange 19 extending parallel to the under surface of plate 16, and spaced from the plate 16. It will be noted that the upper surface of pillar 15 is off-set as at 20 and 21, thus forming a series of steps in the upper surface of the pillar. Secured to the off-set 20 by nails or screws 22 are a plurality of retainer plates 23 which extend over the off-set 21. Secured to the off-set 21 by nails or screws 24 is an edge of the wheel housing panel 25. The flange 19 is hooked around the extended edges of the retainer plates 23 and rests between those plates and the edge of the panel 25, thus covering the upper surface of the pillar 15 with a smooth plate in which no fastening means appear. It will also be observed that the position of the retainer plates 23 and the flange 19 and the secured edge of the panel 25 provide a neat joint and tends to reinforce the nails or screws 24 which fasten the panel 25 to the pillar 15.

In Fig. 5 I have shown a modification in which a single retainer plate 26 extending over the length of the pillar 15 is substituted for the plurality of retainer plates 23. Ordinarily I prefer to use a plurality of the retainer plates 23 instead of the single retainer plate 26 in order to save metal and weight and because the small retainer plates are more easily applied to the pillar.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In combination, a frame member having a plurality of off-sets in its upper surface, a panel secured to the lower offset, a plurality of retainer plates secured to the intermediate offset and extending over the lower offset, a scuff plate positioned upon the upper surface and having a depending flange secured to the rear side of said frame member, and its outer edge return bent and embracing the extended edges of said retainer plates.

2. In combination, a frame member, a panel having its edge secured to the upper side of said frame member, retainer plates secured to the upper side of said frame member and extending over said secured panel edge, a scuff plate secured upon the upper side of said frame member and covering said retainer plates and panel edge and having its outer edge return bent around and embracing the extended edges of said retaining plates.

3. In combination, a frame member, a panel having its edge secured to the upper side of said frame member, a retainer plate secured to the uper side of said frame member and extending over said secured panel edge, a scuff plate secured upon the upper side of said frame member and covering said retainer plate and panel edge and having its outer edge return bent around and embracing the extended edge of said retainer plate.

4. In combination, a frame member, a panel having its edge positioned upon the upper side of said frame member, means for securing said panel edge to said frame member, retainer plates secured upon the upper side of said frame member and extending above the means securing said panel edge to said frame member, a scuff plate covering the upper side of said frame member and having one edge embracing the extended edges of said retainer plates and covering the means securing said panel edge.

MARVIN W. MOESTA.